United States Patent [19]

Nagao et al.

[11] 4,303,473
[45] Dec. 1, 1981

[54] TORUS TYPE VACUUM SHELL

[75] Inventors: Masato Nagao; Yoshiyasu Ito; Keizou Wase; Yoshiaki Kazawa; Takamasa Fujinaga, all of Hitachi, Japan

[73] Assignee: Hitachi, Ltd., Tokyo, Japan

[21] Appl. No.: 893,020

[22] Filed: Apr. 3, 1978

Related U.S. Application Data

[62] Division of Ser. No. 653,781, Jan. 30, 1976, abandoned.

[30] Foreign Application Priority Data

Feb. 5, 1975 [JP] Japan .................................. 50-14366

[51] Int. Cl.³ .............................................. G21B 1/00
[52] U.S. Cl. .................................... 376/150; 138/173
[58] Field of Search ................................ 176/1, 3–5; 138/121, 173

[56] References Cited

U.S. PATENT DOCUMENTS

| | | | |
|---|---|---|---|
| 1,475,289 | 11/1923 | Diescher | 138/121 |
| 2,406,838 | 9/1946 | Kepler | 138/173 |
| 3,054,742 | 9/1962 | Thonemann et al. | 176/2 |
| 3,109,801 | 11/1963 | Thonemann | 176/1 |
| 3,738,394 | 9/1973 | Westerbarkey | 138/173 |
| 3,774,001 | 11/1973 | Consoli et al. | 176/3 |
| 3,859,615 | 1/1975 | Luton et al. | 176/3 |
| 3,873,930 | 3/1975 | Winterberg | 176/3 |
| 3,886,402 | 5/1975 | Furth et al. | 176/3 |

OTHER PUBLICATIONS

"Proceedings of Fith Symposium on Eng. Problems in Fusion Research", Princeton University, Nov. 5-9, 1973, Frank et al., pp. 394-396.
Wash-1267, 7/73, pp. 1-10, 12-16, 33, 34.
Matt-1050, Aug. 1974, pp. 526-529.
"4th Symposium on Eng. Problems of Fusion Research", Wash., D.C., 4/71, pp. 49-54, Christensen et al.

*Primary Examiner*—Harvey E. Behrend
*Attorney, Agent, or Firm*—Thomas E. Beall, Jr.

[57] ABSTRACT

In a nuclear fusion device having a torus type vacuum shell around which toroidal coils and poloidal coils are wound and arranged and whose interior is maintained in a high vacuum state, the bending rigidity of a shell wall in a circular cross section of the vacuum shell is made higher on the outer periphery side than on the inner periphery side of the circular cross section, thereby to prevent any deformation of the vacuum shell due to a magnetic force and any damage of the shell attendant upon the deformation in a process in which the coils are energized to confine a plasma within the vacuum shell. Moreover, without increasing the inner diameter of the circular cross section of the vacuum shell, the coils are located in proximity to the plasma so as to enhance the plasma producing efficiency.

11 Claims, 9 Drawing Figures

TORUS TYPE VACUUM SHELL

This is a division of application Ser. No. 653,781, filed Jan. 30, 1976, and now abandoned.

BACKGROUND OF THE INVENTION

This invention relates to a torus type vacuum shell for a nuclear fusion device useful for a toridal fusion reactor of the Tokamak type, and more particularly to improvements in a vacuum shell thereof.

In the toroidal fusion reactor which confines a plasma electromagnetically, such plasma is produced with a vacuum shell evacuated into a high vacuum state.

The vacuum shell is formed into the torus type by the use of a non-magnetic metal material. The vacuum shell is provided with poloidal coils which are wound and arranged in the poloidal direction, and toroidal coils which are wound and arranged in the toroidal direction.

As the poloidal coils, there are horizontal field coils which form horizontal magnetic fields in order to effect the vertical control of the plasma produced within the vacuum shell, vertical field coils which form vertical magnetic fields in order to effect the horizontal control of the plasma, multipole field coils which control the plasma so that the plasma itself may become circular in cross section, primary coils which produce the plasma by rapidly changing currents flowing therethrough, and magnetic limiting coils which control the plasma so that the plasma may not come into contact with the inner wall of the shell.

As the toroidal coils, there are toroidal field coils which are wound and arranged in a manner to surround the circular cross section of the vacuum shell and which confine the plasma into the vacuum shell.

In order to enhance the efficiency of producing the plasma and the performance of confining it, the various coils mentioned above need be brought as close to the plasma generating space as possible.

It is therefore desirable that the wall of the vacuum shell is formed to be thin.

On the other hand, the wall need be thick enough to endure a high vacuum (usually, above $10^{-8}$ torr) at the running for the plasma generation.

More important is that the wall construction need also endure intense electromagnetic forces which are caused by the coils at the running. If the vacuum shell wall is deformed by such external forces, it will touch with the plasma and be fused, the vacuum will break off, and the coils will be damaged.

In this manner, in determining the thickness of the vacuum shell, the contrary functions of raising the plasma generating efficiency and enduring the external forces are required.

SUMMARY OF THE INVENTION

It is an object of this invention to provide a torus type vacuum shell for a nuclear fusion device which includes a vacuum shell relieved from the concentration of local stresses locally arising in the vacuum shell due to external forces.

Another object of this invention is to provide a torus type vacuum shell for a nuclear fusion device which can enhance the generating efficiency of a plasma by bringing poloidal coils and toroidal coils closer to the plasma generating space.

In order to accomplish such objects, this invention consists in a torus type vacuum shell in which the bending rigidity of a shell wall in the circular cross section of the vacuum shell is so varied as to become higher from the inner periphery towards the outer periphery of the circular cross section.

Such construction in which the bending rigidity becomes higher from the inner periphery towards the outer periphery of the vacuum shell can be achieved by gradually increasing the thickness of the shell wall.

For the gradual increase of the thickness of the shell wall, the wall may be formed to be continuously or stepwise thicker from the inner periphery towards the outer periphery. In particular, it is preferable that the thickness of the shell wall is made substantially uniform on the inner periphery side so as to render the space factor of the coils larger and that the thickness of the shell wall is varied in a manner to become thicker continuously or stepwise from the boundary part between the inner periphery and the outer periphery towards the outer side.

By increasing the bending rigidity of the shell wall in the circular cross section of the vacuum shell from the inner periphery towards the outer periphery as stated above, the thickness of the shell wall on the inner periphery side can be made small without degrading the strength of the vacuum shell. Moreover, such expedient is not attended with any decrease of the inside diameter of the torus, so that the space factors of the poloidal coils and the toroidal coils can be enhanced.

It is also possible to bring the coils nearer to the plasma generating space.

In order to raise the plasma generating efficiency, it is available to make the electric resistance of the wall of the vacuum shell high.

That is, in order to efficiently effect the electromagnetic couplings between the plasma and the respective coils, magnetic fluxes by the respective coils need be interlinked with the vacuum shell so as to reduce induction currents to flow through the shell wall.

As an expedient for raising the electric resistance of the vacuum shell wall, the vacuum shell is constructed of a single body of bellows or a combined body consisting of bellows and rings, thus to raise the electric resistance of the shell wall in the poloidal direction.

Also to such vacuum shell constructed with the bellows included as at least a part thereof, this invention is applicable in such a way that the height of the crest of the bellows is made larger on the outer periphery side than on the inner periphery side in the circular cross section of the vacuum shell. As regards the vacuum shell comprising the bellows and the rings in combination, only the height of the crest of the bellows may be varied, or the thickness of the ring may be varied as stated above.

The sectional shape of the vacuum shell in the circular cross section may be an oval being narrower on the outer peripheral side, a gourd-shape having a smaller diameter on the outer peripheral side than the inner peripheral side or an ellipse besides the circle. According to the shell whose circular cross section is other than the circle, in case where the magnetic limiter coils are to be arranged within the vacuum shell, the space for installation is easily secured. Moreover, in the case of the oval or the gourd-shape, the magnetic limiter coil can be arranged at a part of a small radius of curvature. The plasma can accordingly be produced at a part of a large radius of curvature, which is effective for making the diameter of the plasma large.

DESCRIPTION OF THE PREFERRED EMBODIMENTS

Figure 1:
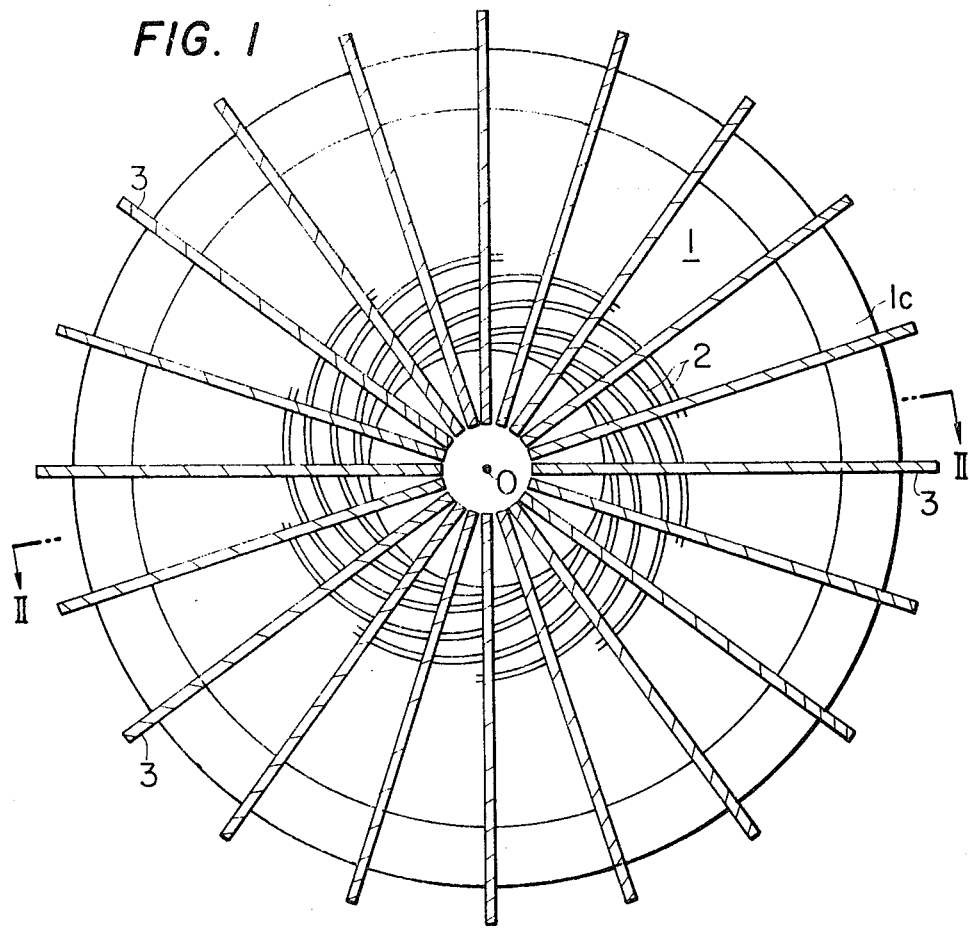
FIG. 1 is a plan view showing the schematic construction of a torus type nuclear fusion device according to this invention.
Figure 2:
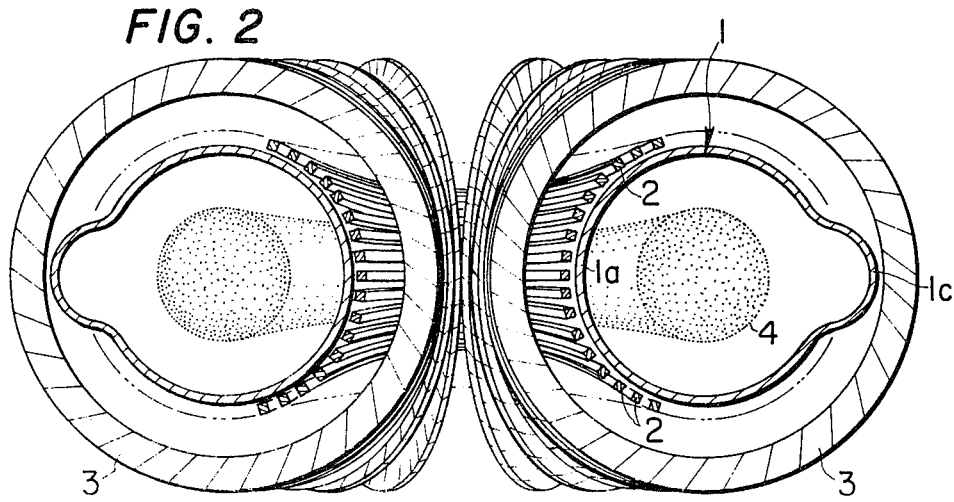
FIG. 2 is a vertical section as viewed along a line II—II in FIG. 1.
Figure 3:
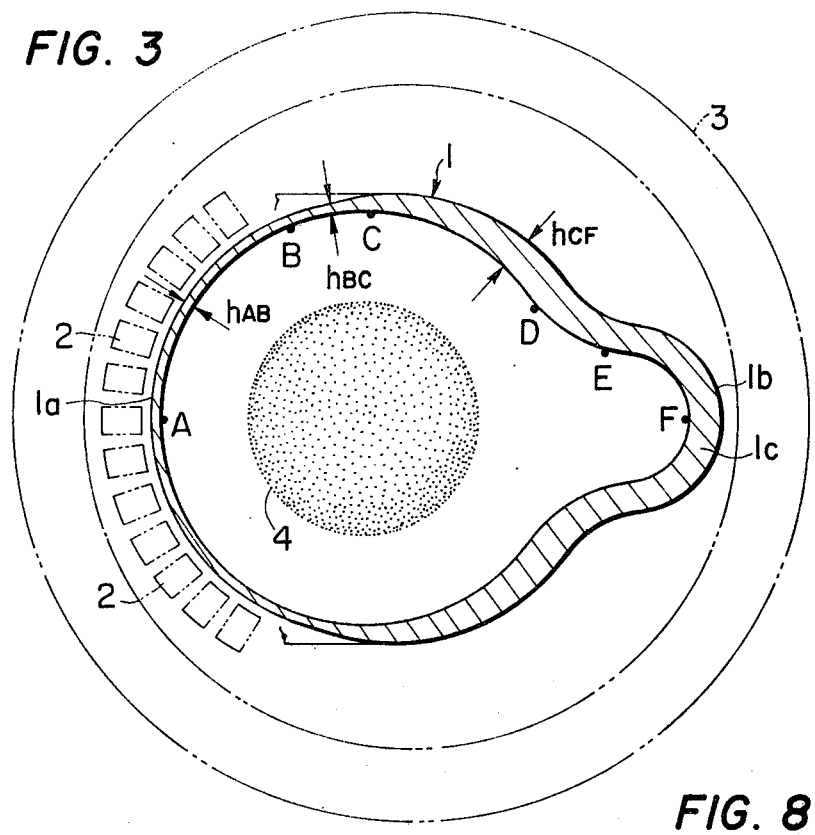
FIG. 3 is a sectional view showing an embodiment of a vacuum shell of this invention as vertically cut along a circular cross section thereof.

First, reference is had to FIGS. 1 to 3. Letter O indicates the position of the center of a torus. A torus type vacuum shell 1 is so arranged that its center is situated at the torus center O.

The vacuum shell 1 is formed to be hollow, and the interior is evacuated to a high vacuum by a vacuum pump (not shown).

The vacuum shell 1 illustrated in FIGS. 1 to 3 is formed with a protuberance 1c on an outer periphery side 1b opposite to an inner periphery side 1a thereof, so that the sectional shape in a circular cross section is gourd-like as a whole. The formation of such protuberance 1c serves to arrange magnetic limiter means within the vacuum shell 1.

Along the torus direction of the vacuum shell 1, a large number of poloidal coils 2 are arrayed around a circular cross section.

Further, a large number of poloidal coils 3 are arrayed in the toroidal direction of the vacuum shell 1, that is, in a manner to surround the girth of the circular cross section.

FIG. 2 illustrates the situation in which a plasma 4 produced within the vacuum shell 1 is confined.

The wall thickness of the vacuum shell 1 is varied so as to gradually increase at points A–F from the minimum diameter portion A of the inner periphery side 1a of the torus to the maximum diameter portion F of the outer periphery side 1b.

More specifically, a wall thickness $h_{AB}$ of the inner periphery side 1a extending from the portion A to the portion B is made as small as possible within a range of thicknesses enduring an external pressure.

In contrast, a varying wall thickness $h_{BC}$ from the portion B to the portion C and a varying wall thickness $h_{CF}$ from the portion C to the portion F are made to continuously become thicker.

In this case, it is also allowed to gradually increase the wall thickness from the portion C to the vicinity of the portion D in a continuous manner and to make the wall thickness from the portion D to the portion F substantially equal to the thickness of the portion D.

By rendering the wall thickness of the vacuum shell 1 larger on the outer periphery side 1b than on the inner periphery side 1a as described above, the bending rigidity of the vacuum shell can be increased, and the vacuum shell 1 can be constructed to be rigid against the external pressure without making the wall thickness of the inner periphery side 1a large.

It is accordingly possible to sufficiently secure a space for arrangement of the coils on the inner diameter side of the vacuum shell 1 closer to the torus center. Moreover, the coils can be located near the plasma 4, so that the efficiency of producing the plasma can be enhanced.

Figure 4:
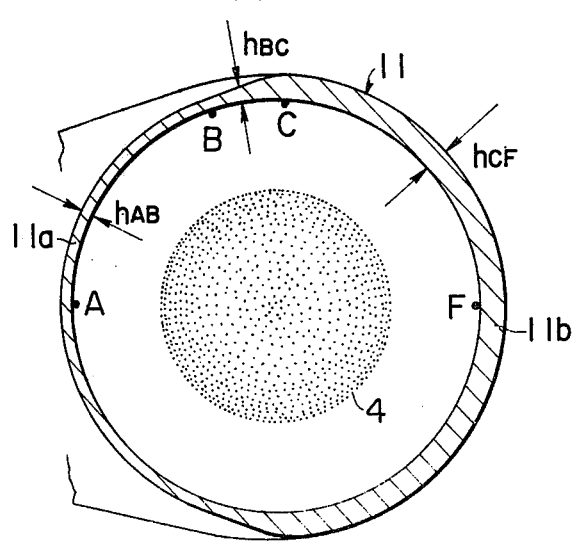
FIG. 4 is a vertical section showing another embodiment of a vacuum shell.

FIG. 4 shows another embodiment in which this invention is applied to a vacuum shell 11 whose sectional shape in the circular cross section is substantially a circle.

In this embodiment, wall thickness $h_{AB}$ between portions A and B on an inner periphery side 11a is made uniform and small, while a wall thickness $h_{CF}$ between portions C and F on an outer periphery side 11b is made uniform and several times larger than the thickness $h_{AB}$.

At the primary portion B–C between the inner periphery side 11a and the outer periphery side 11b, a wall thickness $h_{BC}$ is gradually increased substantially continuously.

Also with this embodiment, the shell wall on the side of the torus center is thinned, thereby making it possible to secure the space for arrangement of the coils and to raise the plasma producing efficiency. Moreover, the bending rigidity of the vacuum shell is made high, whereby the vacuum shell can be effectively prevented from being deformed due to an electromagnetic force or the atmospheric pressure.

Figure 5:
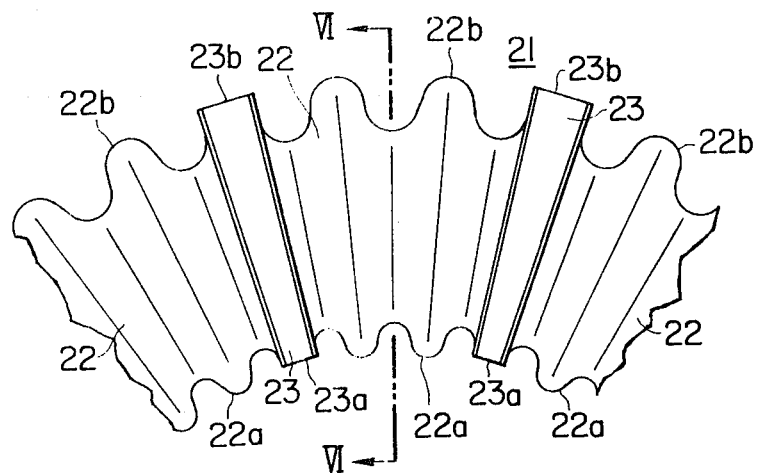
FIG. 5 is a plan view showing a part of an embodiment of a vacuum shell which comprises bellows and rings in combination.
Figure 6:
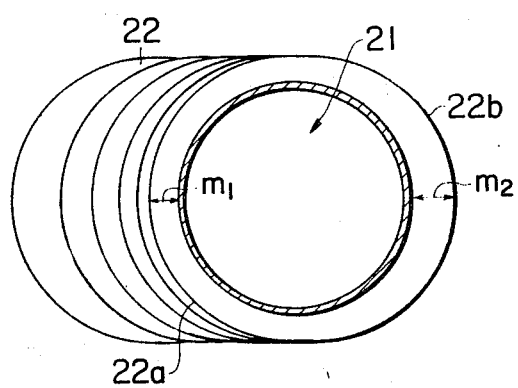
FIG. 6 is a vertical section as viewed along a line VI—VI in FIG. 5.

FIGS. 5 and 6 show an embodiment in which a vacuum shell 21 is constricted by the combination of metallic bellows 22 and metallic rings 23. According to such vacuum shell 21, the wall length in the torus direction thereof can be made large. As electric resistance in the torus direction can therefore be increased. This is effective for retaining current flow through the shell wall.

In case where this invention is applied to such vacuum shell 21, the bending rigidity of the vacuum shell can be made high in such a way that the thickness of the metallic ring 23 on its outer periphery side 23b is made larger than the thickness on its inner periphery side 23a, and/or that the height $m_2$ of the crest of the metallic bellows 22 on its outer periphery side 22b is made larger than the height $m_1$ of the crest on its inner periphery side 22a.

Figure 7:
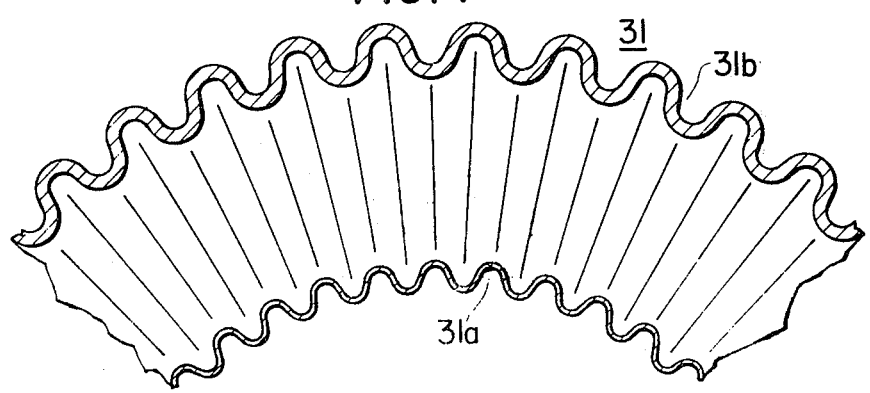
FIG. 7 is a transverse section showing a part of an embodiment of a bellows type vacuum shell.

In an embodiment illustrated in FIG. 7, the bellows thickness of an outer periphery side 31b of a bellows constituting a vacuum shell 31 is made larger than the bellows thickness of an inner periphery side 31a, thereby to increase the bonding rigidity of the vacuum shell.

The bellows construction shown in FIG. 7 may be applied to the bellows 22 depicted in FIGS. 5 and 6.

Figure 8:
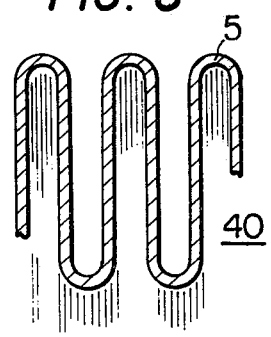
FIGS. 8 and 9 are explanatory views showing examples of the formation of bellows.
Figure 9:
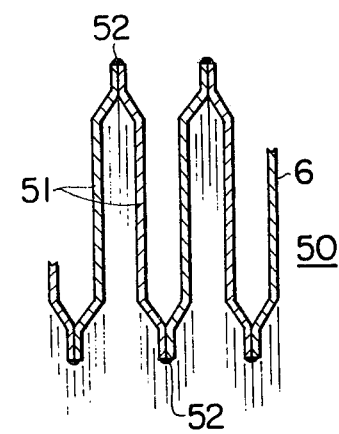

As regards the bellows construction for use in this invention, a bellows 40 which is U-shaped in section and which is formed with crests and troughs by molding an integral metal tube as illustrated in FIG. 8 can be employed. Also employable is a welded bellows 50 which, as seen from FIG. 9, is formed in such a way that inner edges and outer edges of press-worked doughnut-shaped plate pieces 51 are coupled with each other by welding 52.

While several modifications and variations have been shown for purposes of illustrating a specific embodiment and for their own advantages, further modifications, embodiments and variations are contemplated according to the broader aspects of the present invention, all as defined by the spirit and scope of the following claims.

We claim:

1. A torus vacuum shell whose interior may be maintained in a high vacuum state, and having at least a portion extending in a circumferential direction being constructed of a bellows having a wall corrugated in the peripheral direction and extending substantially completely around the toroidal direction to define a crest for each corrugation; toroidal electromagnetic coils and poloidal electromagnetic coils wound around said shell; the height of the crest of the bellows increasing from the inner periphery towards the outer periphery in a radial plane cross section; and the thickness of the bellows wall increasing from the inner periphery towards the outer periphery.

2. A torus type vacuum shell according to claim 1, wherein the configuration of the shell in a radial plane cross section is substantially oval with its outer radius of curvature being substantially smaller than its inner radius of curvature.

3. A torus type vacuum shell according to claim 1, wherein the thickness of the bellows wall is substantially uniform along the entire inner periphery and becomes thicker continuously from the boundary portions between the inner periphery and the outer periphery towards the outer periphery.

4. A torus type vacuum shell according to claim 1, wherein the shell is constructed of alternately coupled bellows sectors and ring sectors, having an uncorrugated wall, around the periphery of the torus.

5. A torus type vacuum shell according to claim 4, wherein the wall thickness of the ring sectors increases from the inner periphery towards the outer periphery.

6. A torus type vacuum shell according to claim 5, wherein the peripheral extent of the ring sectors increases from the inner periphery towards the outer periphery, so that the ring sectors are wedge-shaped.

7. A torus type vacuum shell according to claim 2, wherein the wall thickness of the bellows is substantially uniform along the entire inner periphery and becomes thicker continuously from the boundary portions between the inner periphery and the outer periphery towards the outer periphery.

8. A torus type vacuum shell according to claim 4, wherein the configuration of the shell in a radial plane cross section is substantially oval with its outer radius of curvature being substantially smaller than its inner radius of curvature.

9. A torus type vacuum shell according to claim 8, wherein the wall thickness of the ring sectors increases from the inner periphery towards the outer periphery.

10. A torus type vacuum shell according to claim 9, wherein the peripheral extent of the ring sectors increases from the inner periphery towards the outer periphery, so that the ring sectors are wedge-shaped.

11. A torus type vacuum shell according to claim 4, wherein the peripheral extent of the ring sectors increases from the inner periphery towards the outer periphery so that the ring sectors are wedge-shaped.

* * * * *